(12) United States Patent
Duvall et al.

(10) Patent No.: US 7,756,752 B2
(45) Date of Patent: Jul. 13, 2010

(54) CUSTOMIZATION OF AN ONLINE SHOPPING EXPERIENCE

(75) Inventors: Jimmy Duvall, San Jose, CA (US);
David Jackson, San Mateo, CA (US);
Ashish Kasi, Fremont, CA (US); Con Lam, San Jose, CA (US); Junxu Li, Hayward, CA (US); Ali Mohamed, Mountain View, CA (US); Sung Park, Santa Clara, CA (US); Chandra Pisupati, Sunnyvale, CA (US); Sheridan Rawlins, Mountain View, CA (US); Timothy Reeth, Burlingame, CA (US); Aamod Sane, Fremont, CA (US); Boris Shkolnik, Santa Clara, CA (US); Deyang Song, Belmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1205 days.

(21) Appl. No.: 11/209,595

(22) Filed: Aug. 22, 2005

(65) Prior Publication Data

US 2007/0043626 A1    Feb. 22, 2007

(51) Int. Cl.
*G06Q 30/00* (2006.01)
(52) U.S. Cl. .............................. 705/26; 705/1; 705/27; 705/51; 705/67; 705/75; 709/218; 709/219
(58) Field of Classification Search .................... 705/1, 705/26, 27, 51, 67, 75, 80; 709/218, 219
See application file for complete search history.

(56) References Cited

U.S. PATENT DOCUMENTS 6,330,575 B1    12/2001 Moore et al.
6,484,149 B1    11/2002 Jammes et al.
6,970,852 B1 *  11/2005 Sendo et al. ................... 705/67
7,231,373 B2 *   6/2007 Kidd et al. ..................... 705/75
2003/0225631 A1 * 12/2003 Howell et al. .................. 705/27

OTHER PUBLICATIONS

Belapurkar, Abhijit "Use continuations to develop complex Web applications, A programming paradigm to simplify MVC for the Web" (visited Apr. 1, 2005) <http://www-106.ibm.com/developerworks/library/j-contin.html>.
Predescu, Ovidiu et al. "Advanced Control Flow" The Apache Software Foundation, pp. 1-17 (2005).

(Continued)

*Primary Examiner*—Yogesh C Garg
(74) *Attorney, Agent, or Firm*—Frommer Lawrence & Haug, LLP; John W. Branch

(57) ABSTRACT

Modification of the presentation of page appearance, page navigation flow, and other aspects of the user experience of an online shopper navigating the virtual shopping cart and checkout pages of an online store is achieved without compromising the security of checkout processing. The modification may include customization, and various configuration and customization tools may be employed. The online shopper experiences continuity between unsecured-connection pages presenting items for purchase and secured-connection pages presented for checkout processing. In one embodiment, page navigation flow is modified using continuations implemented using a relatively small stack to save information relating to the flow. In another embodiment, a page designer enables a dynamic version of a page specification program to be generated, such as by way of a page customization interface. Partial evaluation is employed to generate a version of the program that is executed at request time.

21 Claims, 10 Drawing Sheets

OTHER PUBLICATIONS

Predescu, Ovidiu "Apache Cocoon—Control Flow, Control Flow" (visited Mar. 31, 2005) <http://cocoon.apache.org/2.1/userdocs/flow/index.html>.

Predescu, Ovidiu "Advanced Control Flow, A different approach" (visited Mar. 31, 2005) <http://cocoon.apache.org/2.1/userdocs/flow/continuations.html>.

Predescu, Ovidiu "Advanced Control Flow, Cocoon and continuations" (visited Mar. 31, 2005) <http://cocoon.apache.org/2.1/userdocs/flow/how-does-it-work.html>.

Predescu, Ovidiu "Advanced Control Flow, Using Cocoon's Control Flow" (visited Mar. 31, 2005) <http://cocoon.apache.org/2.1/userdocs/flow/using.html>.

The Apache Software Foundation "Advanced Control Flow, Tutorial: A Gentle Introduction to Cocoon Control Flow" (visited Mar. 31, 2005) <http://cocoon.apache.org/2.1/userdocsflow/tutor.html>.

Predescu, Ovidiu et al., "Advanced Control Flow, Sitemap" (visited Mar. 31, 2005) <http://cocoon.apache.org/2.1/userdocs/flow/sitemap.html>.

* cited by examiner

CUSTOMIZATION OF AN ONLINE SHOPPING EXPERIENCE

FIELD OF THE INVENTION

The present invention relates generally to interfaces for network users, and more particularly, but not exclusively, to a method and system for modifying the presentation of the virtual shopping cart, checkout pages, and the like for an online store.

BACKGROUND OF THE INVENTION

The growth of electronic commerce has been fueled particularly by the popularity and convenience of online store websites. The number of enterprises selling products and services online has grown, and there has been a corresponding increase in the variety of products sold online and the diversity of online customers and online merchants. A merchant planning an online store website will typically seek to create a particular experience for the online shopper that supports the commercial goals, merchandising efforts, and branding strategies of the merchant.

Many online merchants lack the institutional expertise and internal technological resources to design and operate every aspect of an online store themselves. It is thus common for merchants to contract with an independent party for such services. In some cases this may conflict with the goal of having a store design and a shopping experience that are tailored to the commercial needs and conditions of a particular merchant. For example, some independent providers of online store design or hosting services may provide merchants with a "one size fits all" template for the pages of an online store that present items for browsing and selection for purchase.

Even where merchants are given some ability to customize the shopper experience for online store sites, however, security considerations have generally prevented independent operators of online store site services from enabling merchant customization of the shopping cart itself and of the checkout experience. Checkout processing pages are typically provided over a secure or authenticated connection, and concerns about the integrity of the payment process in online transactions have typically allowed trivial branding of these pages at best. Because typically merchant customization is limited to the pre-purchase portion of the online shopping experience, an online shopper generally experiences discontinuity when the checkout process is initiated. For example, the shopper may experience the launching of checkout as a removal from the store in which the shopper had been browsing. The checkout phase of the online shopping experience has thus tended to be uniform across different merchants and product lines, and merchants have been impeded from using the checkout experience to further their commercial goals and maximize their sales.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
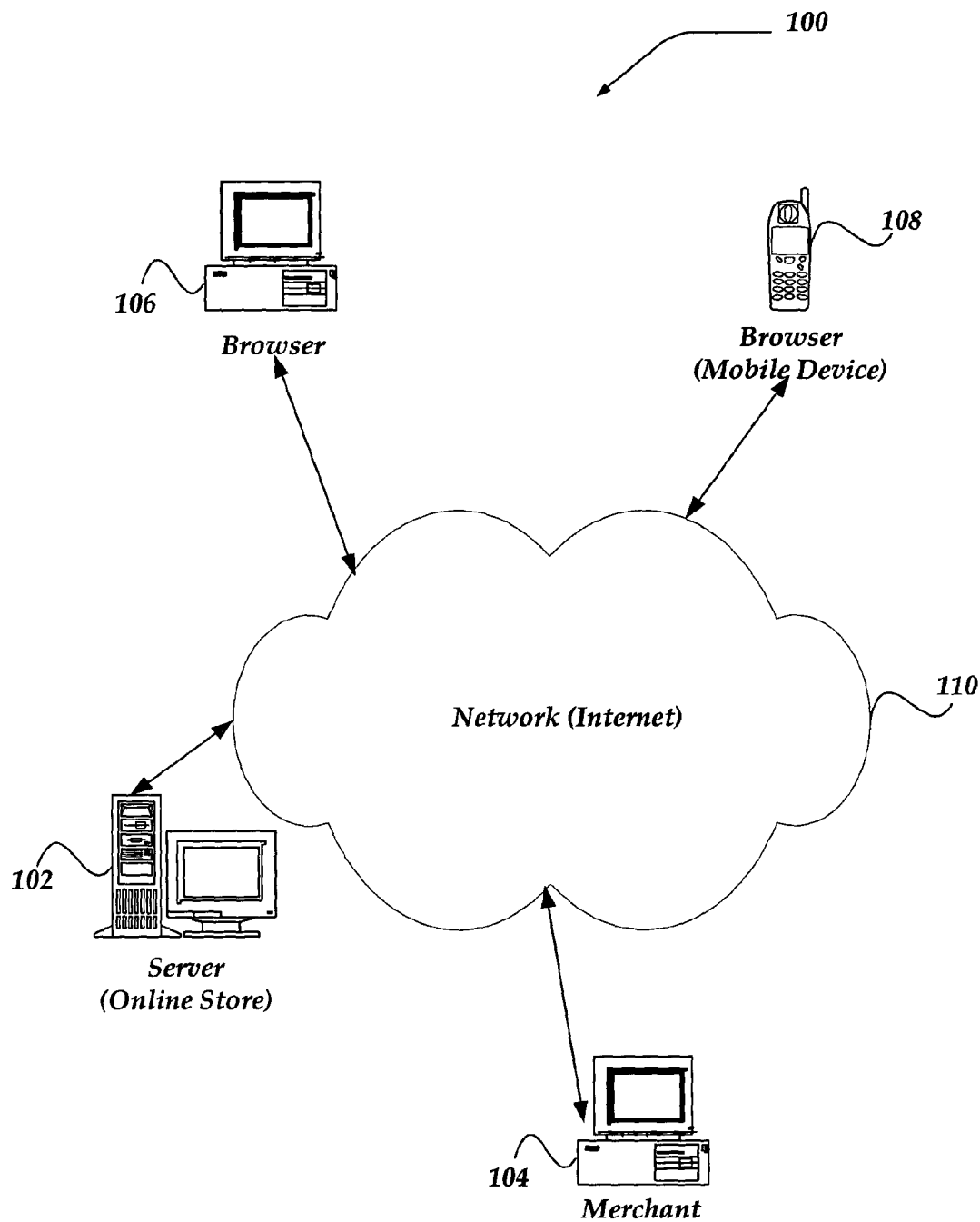
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other embodiments, the present invention may be embodied as methods or devices, and the following detailed description is not to be taken in a limiting sense.

The invention is directed towards enabling the modification of the presentation of the user experience for a user, such as an online shopper, who navigates the pages of an online store or another kind of site. In particular, the invention enables customization of page appearance, page navigation flow, and other aspects of the user experience. The modification may be achieved by a third party in relation to the provider and operator of the site. In embodiments involving the design and operation of an online store or other interactive or informational sites enabling purchase of items, the invention permits a merchant or another third party entity to customize the virtual shopping cart and the checkout pages presented to the online shopper. This customization is achieved without sacrificing or compromising the security of checkout processing. A merchant may thus design the pages for a site so that, for example, an online shopper experiences continuity between unsecured-connection pages presenting items for purchase and secured-connection pages presented for checkout processing.

Various kinds of configuration and customization tools may be employed by a merchant or site designer in accordance with the invention. In one embodiment, a site designer may customize the page navigation flow experienced by a shopper navigating pages for a site, such as checkout processing pages. The customization of page flow is implemented using continuations, allowing page navigation processing to be suspended and then restored when user input is received. Previous uses of continuations to specify page flows have tended to be very expensive in consumption of resources, in part because they employ the underlying programming language to save and restore the state of the entire call stack of an executing program. In contrast, an embodiment of the invention enables a separate, relatively small stack to save information relating to the customized page flow. Page flows may be describable by way of calls to a library, such as a library implemented in C++ or another programming language. These calls may be used within a program or script for processing the customized page flow.

Another embodiment of the invention enables a site designer to modify the presentation of the appearance and content of individual pages for a site, such as the pages provided to a shopper during checkout or pages displaying information regarding a shopping cart. The site designer may interact by way of a customization interface or other kind of modification interface to select one or more displayable components, which are displayed dynamically within the interface. Partial evaluation of a dynamic version of a page specification program for a page is performed, so that parts of the page that are identified as statically determinable at design time are evaluated. The remaining dynamic parts of the page specification program are executed at a later time, such as when the page is requested by a shopper navigating an online store site. This later execution results in the generation of a fully evaluated version of the page.

A page designed, generated, and provided for display over a network in accordance with the invention may include a web page encoded as a document written in HTML or another page formatting or page description language, such as Wireless Markup Language (WML). A page may be provided over a network by a server to a client in accordance with a network protocol such as Hypertext Transfer Protocol (HTTP) and may be provided in accordance with a security protocol such as Secure Sockets Layer (SSL). For example, a page in the checkout processing phase of an online shopping experience may be provided using HTTPS, which is HTTP over an SSL-secured connection. The display may occur by way of a browser application or another application. A script or executable program, such as a script written in PHP Hypertext Preprocessor (PHP), may be used in generating the page, dynamically or otherwise. Accordingly, references in this specification and the accompanying claims to a "page" may include one or more scripts or programs that generate a page.

Illustrative Operating Environment

FIG. 1 illustrates one embodiment of an environment in which the present invention may operate. Not all of these components may be required to practice the invention, and variations in the arrangement and type of the components may be made without departing from the spirit or scope of the invention. The illustrated environment includes one suitable for use as a system for designing and deploying pages for online shopping, including the operator of an online store associated with a third-party merchant. However, the invention is also applicable to other environments, including environments in which a merchant independently designs and operates an online store, as well as environments not involving online shopping services or other forms of electronic commerce, such as interactive and/or informational websites.

As illustrated in FIG. 1, system 100 includes computing devices 102-108 coupled to and capable of communicating with one another across network 110. Computing devices 102-108 include server 102 used in operating an online store, a computing device operated by a third party 104 with respect to the operator of the online store, such as a third-party merchant, and clients 106-108 configured to run browser applications. Clients 106-108 include, for example, personal computer 106 running a web browser application, and web-enabled mobile device 108. Server 102 runs a web server application and related applications, such as an engine for dynamically generating HTML pages in accordance with scripts written in a language such as PHP and/or an application for controlling the navigation flow of pages served by server 102. Typically, server 102 is coupled to other devices that perform related or specialized tasks and that may also be coupled to network 110. For example, server 102, or an additional server device (not shown) linked to network 110 and, in some embodiments, coupled to server 102, may provide an interface for third party 104 for customizing the appearance and page navigation flow for one or more pages to be used for an online store or the like. In such a case, third party 104 may operate as a client with respect to server 102 or the additional server device.

Computing devices 102-108 may each include virtually any device that is configured to perform computation and that is capable of sending and receiving data communications by way of one or more wired and/or wireless communication interfaces. Devices 102-108 may be configured to communicate using any of a variety of network protocols. For example, server 102 may be configured to execute a web server application that employs a protocol such as HTTP or HTTPS to communicate information, such as a web page, across network 110 to client 106. Client 106 is configured to execute a browser application that employs HTTP or HTTPS to request information from server 102 and then displays the retrieved information to a shopper. The browser application may also be used to communicate data to server 102. Computing devices 102-108 may generally include server computers, personal computers, desktop computers, handheld computers, mobile devices, workstations, computers configured as client devices, personal digital assistants, programmable consumer electronics, wireless devices, and the like.

Network 110 is configured to couple one computing device to another computing device to enable them to communicate data. Network 110 is enabled to employ any form of machine-readable media for communicating information from one electronic device to another. Network 110 may include one or more of a wireless network, a wired network, a local area network (LAN), a wide area network (WAN), a direct connection such as through a Universal Serial Bus (USB) port, and the like, and may include the set of interconnected networks that make up the Internet. On an interconnected set of LANs, including those based on differing protocols, a router acts as a link between LANs, enabling messages to be sent from one to another. Communication links within LANs typically include twisted wire pair or coaxial cable. Communication links between networks may generally utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those skilled in the art. Remote computers and other electronic devices may be remotely connected to LANs or WANs by way of a modem and temporary telephone link. In essence, network 110 may include any communication method by which information may travel between computing devices.

The media used to transmit information across communication links as described above illustrate one type of machine-readable media, namely communication media. Generally, machine-readable media include any media that can be accessed by a computing device, including processor-readable media. Processor-readable media may include data storage media, network communication media, and the like. Moreover, communication media typically embody information comprising processor-readable instructions, data structures, program components, or other data in a modulated data signal such as a carrier wave or other transport mechanism, and such media may include any information delivery media. The terms "modulated data signal" and "carrier wave signal" include a signal that has one or more of its characteristics set or changed in such a manner as to encode information, instructions, data, and the like, in the signal. By way of example, communication media include wired media such as twisted pair, coaxial cable, fiber optic cable, and other wired media, and wireless media such as acoustic, RF, infrared, and other wireless media.

Illustrative Computing Device

Figure 2:
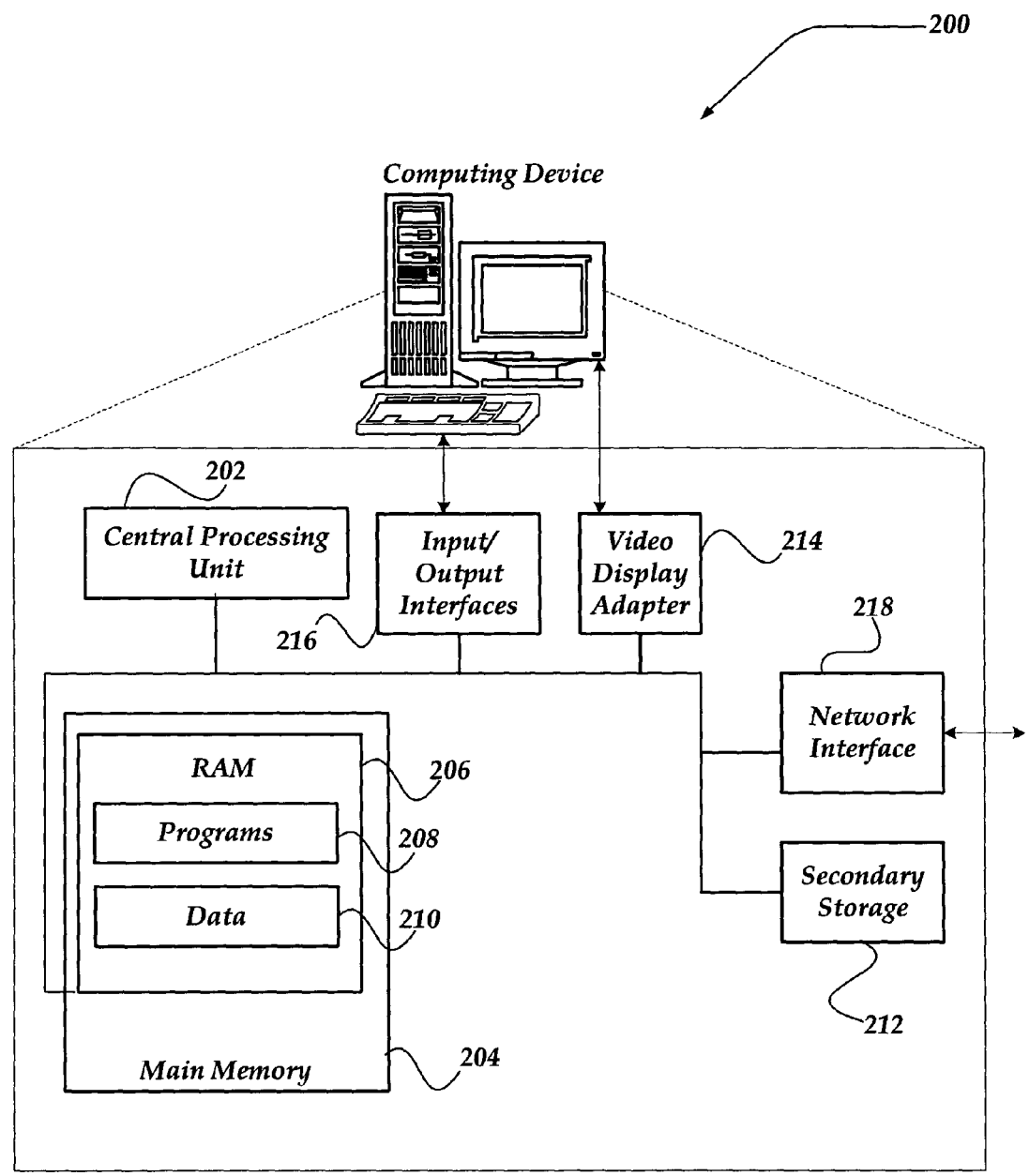
FIG. 2 illustrates one embodiment of a computing device that may be employed for various purposes in a system implementing the invention.

FIG. 2 shows one embodiment of a computing device 200 suitable for use as a client device, a server device, or another kind of computing device functioning other than as a client or server, such as, for example, clients 106-108, server 102, and third party-operated computing device 104 of FIG. 1, in a system implementing aspects of the invention. Device 200 may include many more or fewer components than those shown in FIG. 2 and components different from those shown in FIG. 2, as for example if device 200 represents a mobile device such as client 108. However, the components shown are sufficient to disclose an illustrative embodiment for practicing the present invention. The details of such devices are rudimentary to those having skill in the art and need not be described at length here.

As shown in FIG. 2, device 200 includes a central processing unit 202 in communication with a main memory 204. Main memory 204 may include RAM 206, ROM (not shown), and other storage means. Device 200 also typically includes at least one secondary storage device 212 such as a magnetic disk, an optical disk, and the like, for nonvolatile storage. Main memory 204 and secondary storage device 212 illustrate another example of computer-readable media for storage of information such as computer-executable instructions, data structures, program components, and other data.

Device 200 further includes a video display adapter 214 for communication with a display, and other input/output interfaces 216 for communicating with other peripheral input/output devices, such as a mouse, keyboard, or other such devices. Device 200 also includes network interface 218. By way of network interface 218, device 200 may be coupled to one or more networks, such as network 110 of FIG. 1. Network interface 218 is configured for use in accordance with one or more network protocols and technologies including, but not limited to, the TCP/IP protocol suite and various protocols conceptually residing below and above the TCP/IP protocol suite.

Main memory 204 is suitable for use in storing computer-executable programs 208 and computer-readable data 210. For example, main memory 204 may store data packets that are formatted in accordance with one or more network protocols and that are sent to or received from another computing device by way of network interface 218, and main memory 204 may store data comprising the data contents of a web page encoded in HTML. Main memory 204 stores programs 208 which include computer-executable instructions. Such programs include an operating system, programs that enable network communication by way of network interface 218, programs associated with a web server or a web client, programs that visually render web pages, such as a web browser client application or an application providing an interface for customizing the design of web pages, programs that execute or interpret scripts used in rendering interactive web pages, and the like.

Customization Architecture

Figure 3:
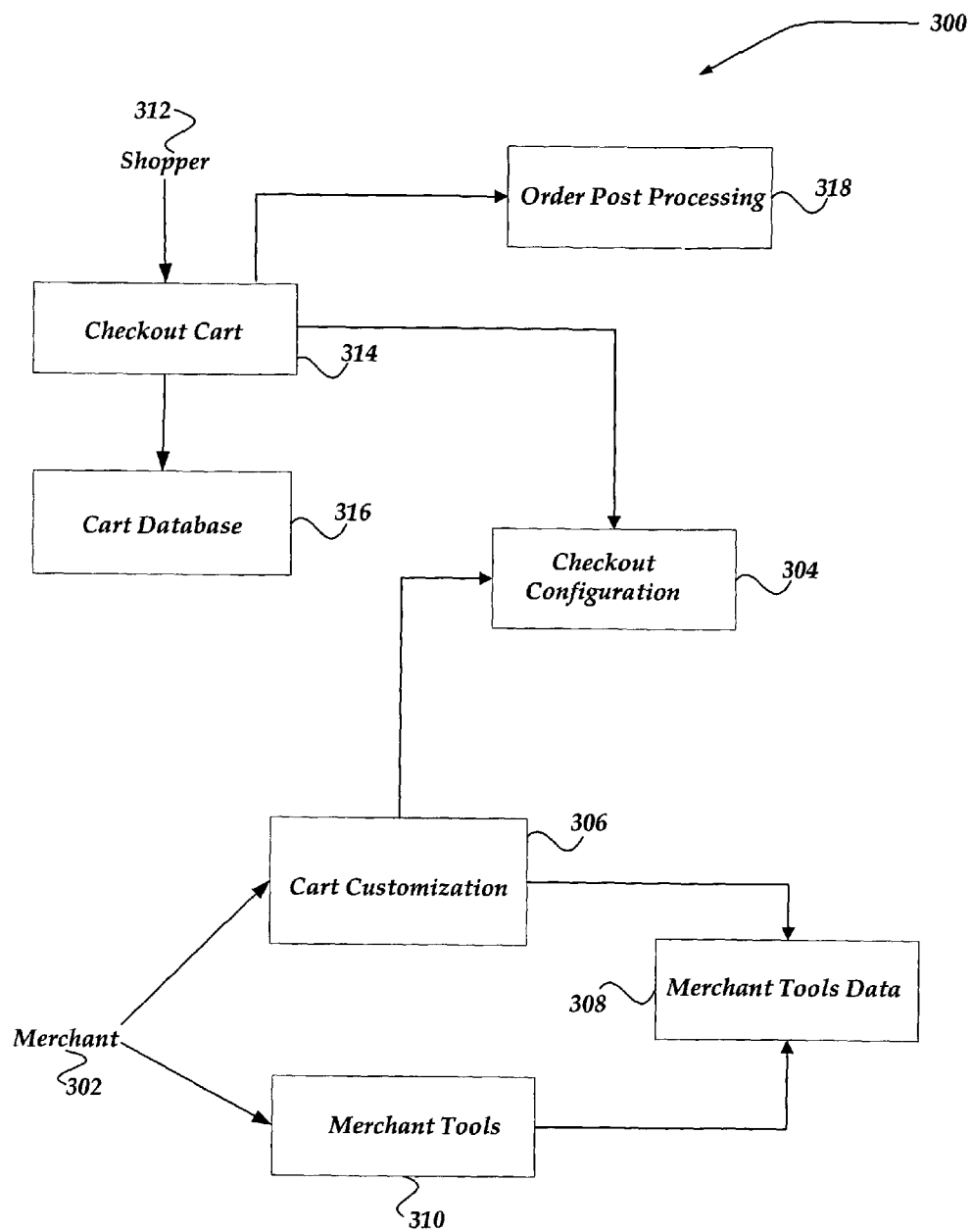
FIG. 3 is a block diagram illustrating elements of an architecture for modification of the presentation of the shopping cart and checkout pages of an online store.

FIG. 3 is a block diagram illustrating elements of an architecture 300 for modification of the presentation of the shopping cart and checkout pages of an online store, as experienced by an online shopper. As noted, the modification may be initiated by a third-party merchant operating independently of the entity hosting and operating the online store. The modification may include customization of page appearance and content, page navigation flow, and other kinds of customization. It should be noted that the present invention also encompasses other embodiments, such as embodiments in which a merchant is also the host or operator of the online store site, and embodiments that include non-commercial interactive and/or informational website applications. Some simple examples of the customizations of page appearance that may be performed in the online store checkout context include customized headers and footers (for example, for branding purposes); adding custom fields to various page sections, such as fields relating to shipping and billing processing; specifying the order of particular fields within a page; choosing particular features such as gift certificates and coupons; and choosing the presentation of forms, such as the use of radio buttons instead of drop-down menus. With respect to customization of page flow, a merchant may choose from among a set of available flows, such as single-page checkout, checkout with separate shipping and billing pages, and checkout with separate shipping, billing, and order review pages.

Architecture 300 illustrates, among other elements, the interfaces provided to third-party merchant 302 during a page design phase in which page and page flow customization are initiated, and to online shopper 312 during a page delivery phase in which the modified presentation of pages are provided in accordance with the customized page flow. Merchant 302 interacts with a set of provided customization and configuration tools, including cart customization tools 306 which are specifically for shopping cart and checkout page customization, and other merchant tools 310 which are used to configure and specify other aspects of the online store. Data relating to modifications performed by merchant 302 is stored in merchant tools data 308. Cart customization tools 306 are used for generating checkout configuration data 304.

Shopper 312 interacts by way of checkout cart 314, which includes an interface and associated components for presenting checkout pages and shopping cart data to shopper 312. A shopping cart may be displayed while shopper 312 is browsing items for potential purchase and prior to or following initiation of checkout processing. Checkout cart 314 uses data stored in cart database 316. Checkout cart 314 also employs checkout configuration data 304 which is generated by merchant 302 using cart customization tools 306. Data associated with checkout cart 314 is used by order post processing component 318 when checkout processing is initiated.

Figure 4:
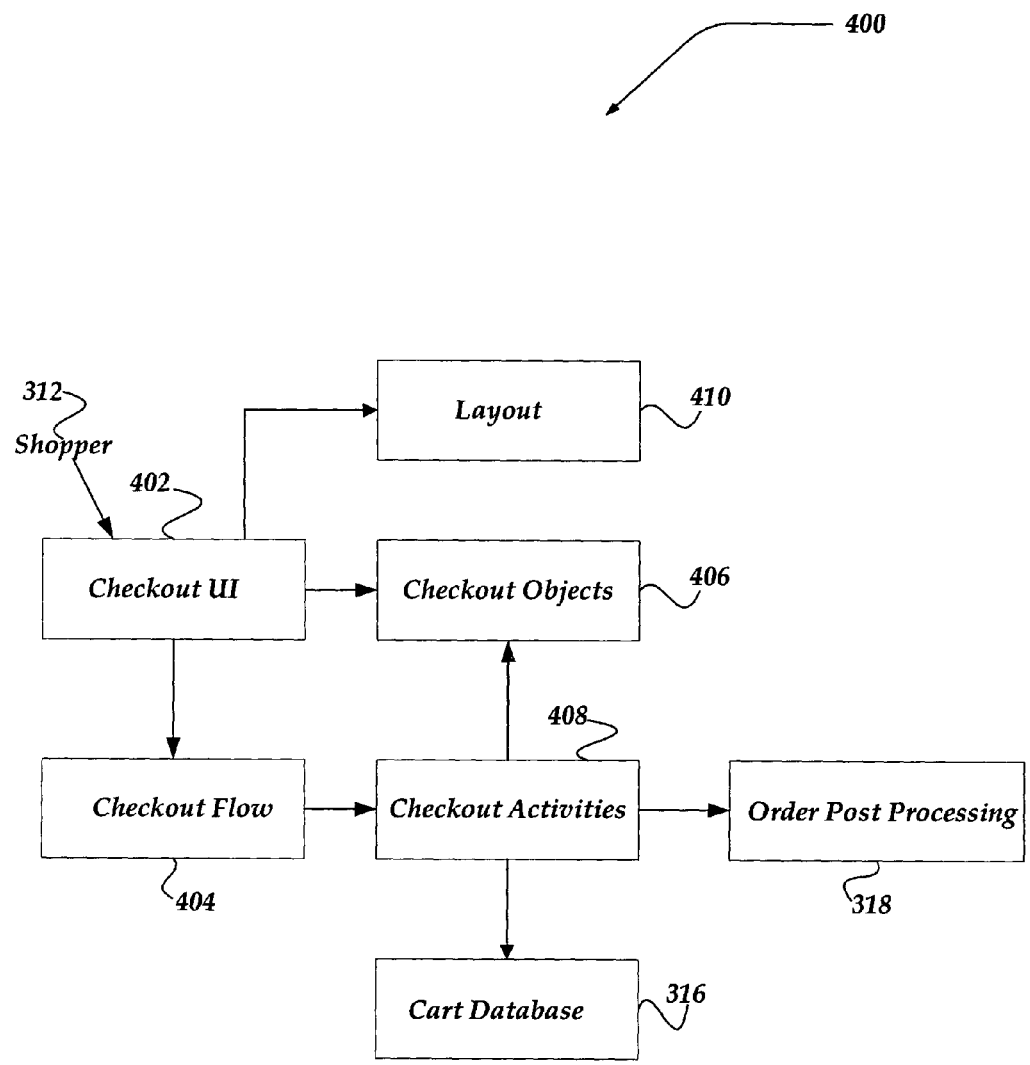
FIG. 4 is a block diagram illustrating in further detail elements of the architecture generally illustrated in FIG. 3, including the interfaces and components associated with a customized checkout cart.

FIG. 4 is a block diagram illustrating in further detail elements of the architecture shown in FIG. 3, including the interfaces and components associated with customized checkout cart 314. As expanded in FIG. 4, checkout cart interface 314 includes checkout user interface (checkout UI) 402, checkout flow 404, checkout objects 406, layout 410, and checkout activities 408. Checkout UI 402 includes the interface presented to shopper 312. The presentation of checkout UI 402 is modified using one or more sets of configuration tools. In one embodiment, following the customization of page appearance, a partial evaluation technique is applied to a page specification program associated with the customized page, enabling some parts of the program to be converted to static form, leaving other parts for evaluation when the page is requested over a network by a shopper navigating a site, or at another time.

Checkout UI 402 uses one or more presentation layouts 410 generated based on customizations by the merchant using the tools illustrated in FIG. 3. Checkout UI 402 also employs checkout flow component 404 for controlling page navigation flow for interaction by shopper 312. In an embodiment, as described above and below, a technique for specifying page flow that employs continuations and a relatively small page flow stack is used, permitting the organization of flows to be separated from checkout objects 406 and checkout activities 408 which are used in checkout processing.

Checkout objects 406 include objects that are used in checkout processing to implement functional aspects of checkout, as by representing items for purchase, shopping carts, coupons, gift certificates, and the like. Checkout objects 406 include data as well as behavior defined by methods for marshalling, storing, and logging data. Checkout activities 408 include activities employing checkout objects 406 and associated with interactions with external payment and shipping providers, order posting as handled by order post processing component 318, and other activities such as taxation and shipping calculations. Checkout activities include communication with cart database 316.

Figure 5:
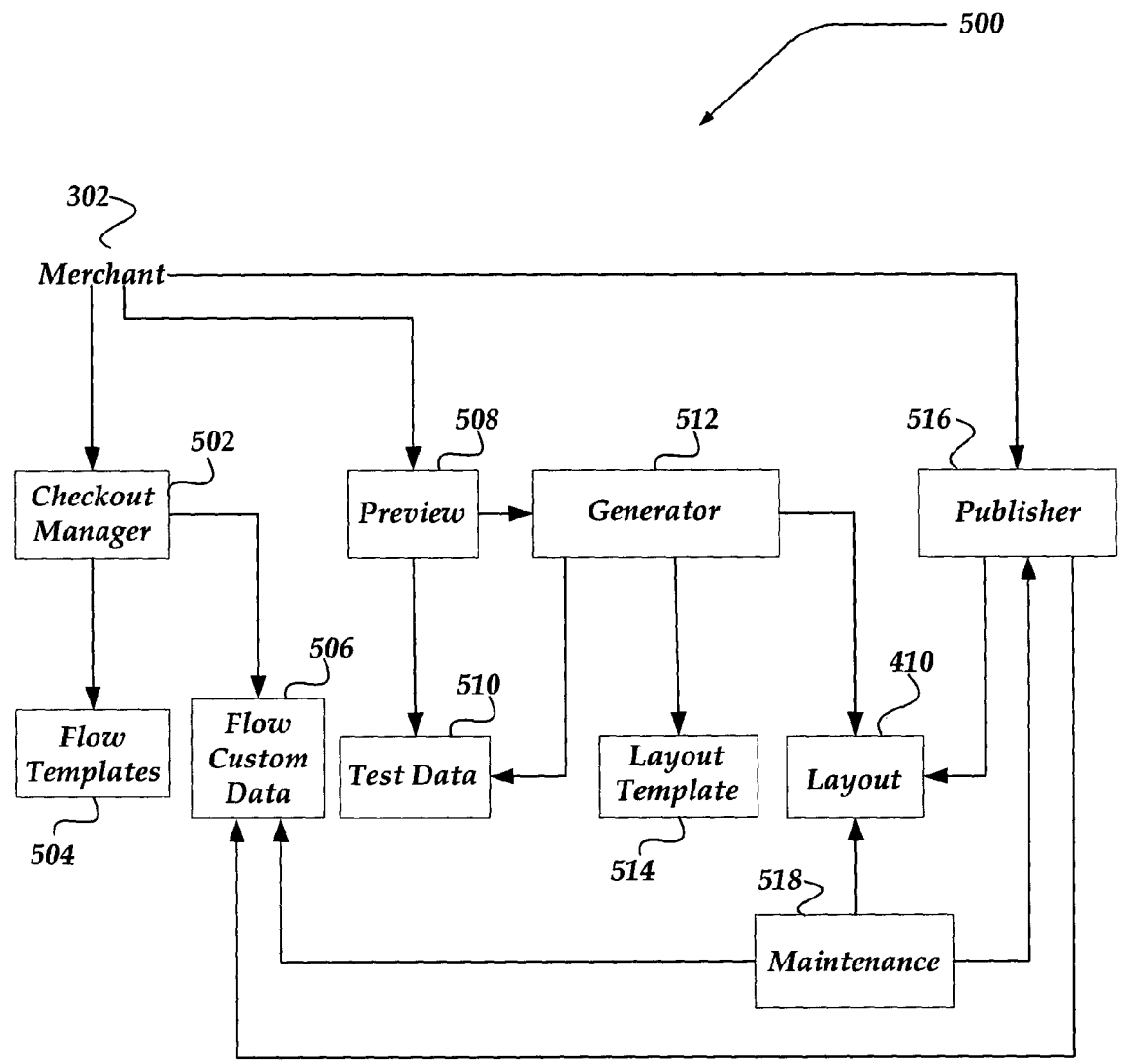
FIG. 5 is a block diagram illustrating in further detail elements of the architecture shown in FIG. 3, including the interfaces and components associated with cart customization tools.

FIG. 5 is a block diagram illustrating in further detail elements of the architecture shown in FIG. 3, including the interfaces and components associated with cart customization tools 306. Merchant 302 interacts with checkout manager 502, which is the interface to the modification and customization system made available to merchant 302. Using particular modification tools, merchant 302 employs checkout manager 502 to customize the presentation of checkout flows and other features of checkout. For example, merchant 302 may use checkout manager 502 to add custom fields to various forms, to change the look and feel of checkout pages, and so forth. Checkout manager 502 reads data in flow templates 504 and default values contained in flow custom data 506 and combines this data with data selected or provided by merchant 302 for customization of page appearance and page flow. Checkout manager 502 thereby generates merchant-specific customizations stored in flow custom data 506.

Merchant 302 also interacts with preview engine 508. Preview engine 508 uses generated flow custom data 506, which is treated as "working" data for specifying page appearance while customization is still in progress. Preview engine 508 combines flow custom data 506 with test data 510, which is used to simulate interaction by a shopper. Test data 510 includes sample item data representing intended purchases by a shopper. Preview engine 508 uses the combined data to present a preview of cart and checkout pages to merchant 302. If merchant 302 completes the previewing and testing process, preview engine 508 invokes generator 512 to generate the final versions of page layouts 410. Layout templates 514 reflect the presentation alternatives and features chosen by merchant 302, as well as alternatives that apply depending on shopper data. Generator 512 combines layout templates 514 with modifications specified by merchant 302 to produce layouts 410. Generator 512 performs partial evaluation with respect to parts of pages that are statically determinable at design time. Partially-evaluated layouts 410 may then be made available by publisher 516 for delivery to shoppers or other network users. Publishing by way of publisher 516 may be initiated by merchant 302. Merchant 302 is able to revert from a working version to the published version of customized checkout and shopping cart-related pages.

Maintenance component 518 is employed for fixing errors and adding changes to merchant-generated layouts 410. Maintenance component 518 interacts with publisher 516 for publishing pages in bulk across multiple stores.

Generalized Operation

Figure 6:
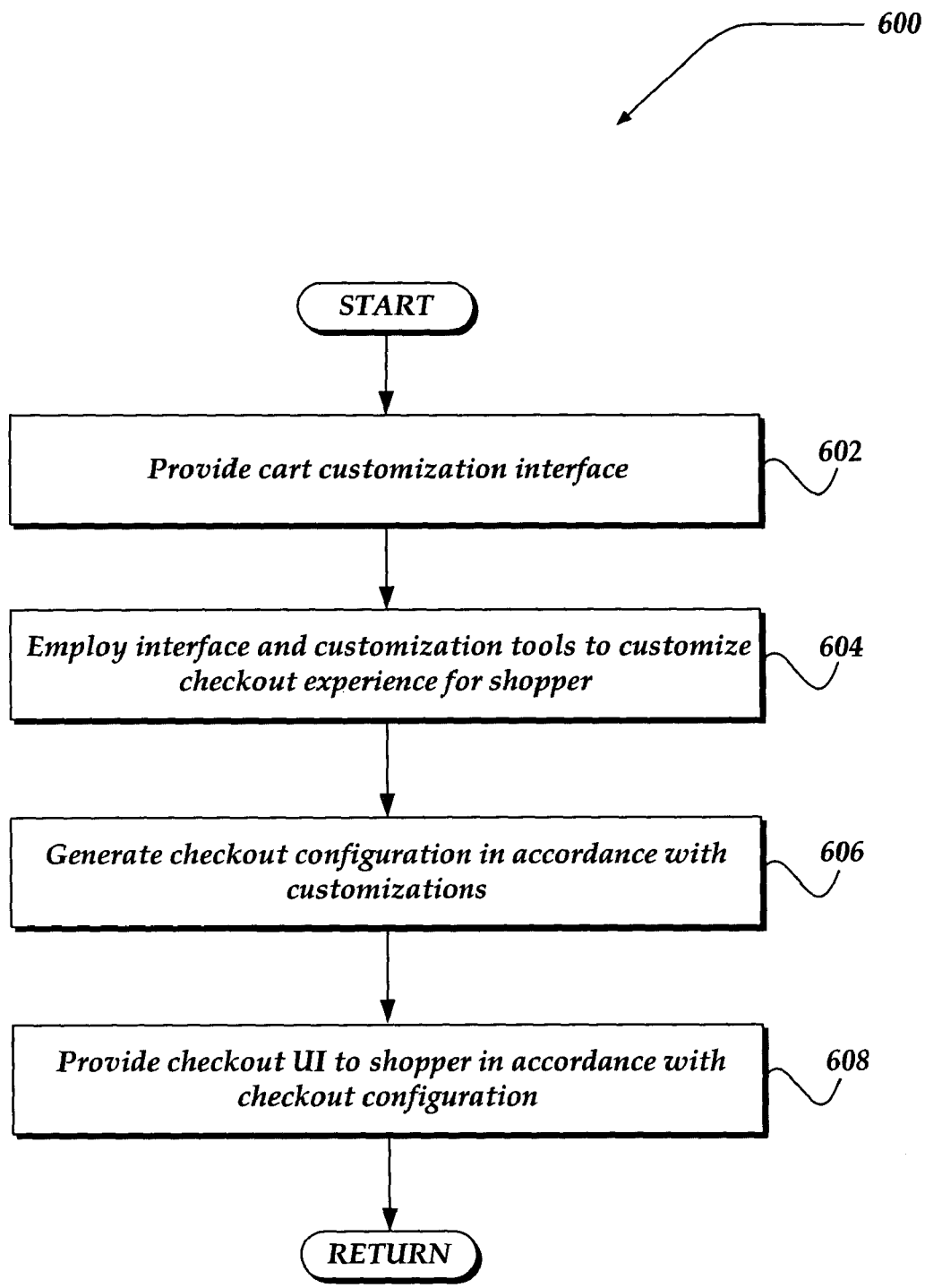
FIG. 6 illustrates a logical flow diagram generally showing one embodiment of a process for modifying the presentation of a checkout experience for an online shopper.

The operation of certain aspects of the invention will now be described with respect to FIGS. 6-10. FIG. 6 is a logical flow diagram illustrating a generalized process 600 for customizing or otherwise modifying the presentation of a checkout experience for an online shopper. Process 600 begins, after a start block, at block 602, where a cart customization interface is provided (for example, to a third-party merchant). Next, at block 604, the customization interface and associated customization tools are employed to configure the presentation of the checkout experience, such as by customizing the appearance of individual pages and customizing the page navigation flow for the shopper. Process 600 next flows to block 606, at which a checkout configuration is generated in accordance with the customizations and other modifications specified by way of the customization interface. This may include generation and publishing of pages, to be made available for display over a network to shopper or other users, and generation of a specified control for page navigation flow. Next, processing flows to block 608, where a checkout user interface is presented to the online shopper in accordance with the generated checkout configuration. In particular, pages are presented to the shopper in accordance with the specified flow. Process 600 then returns to perform other actions.

Figure 7:
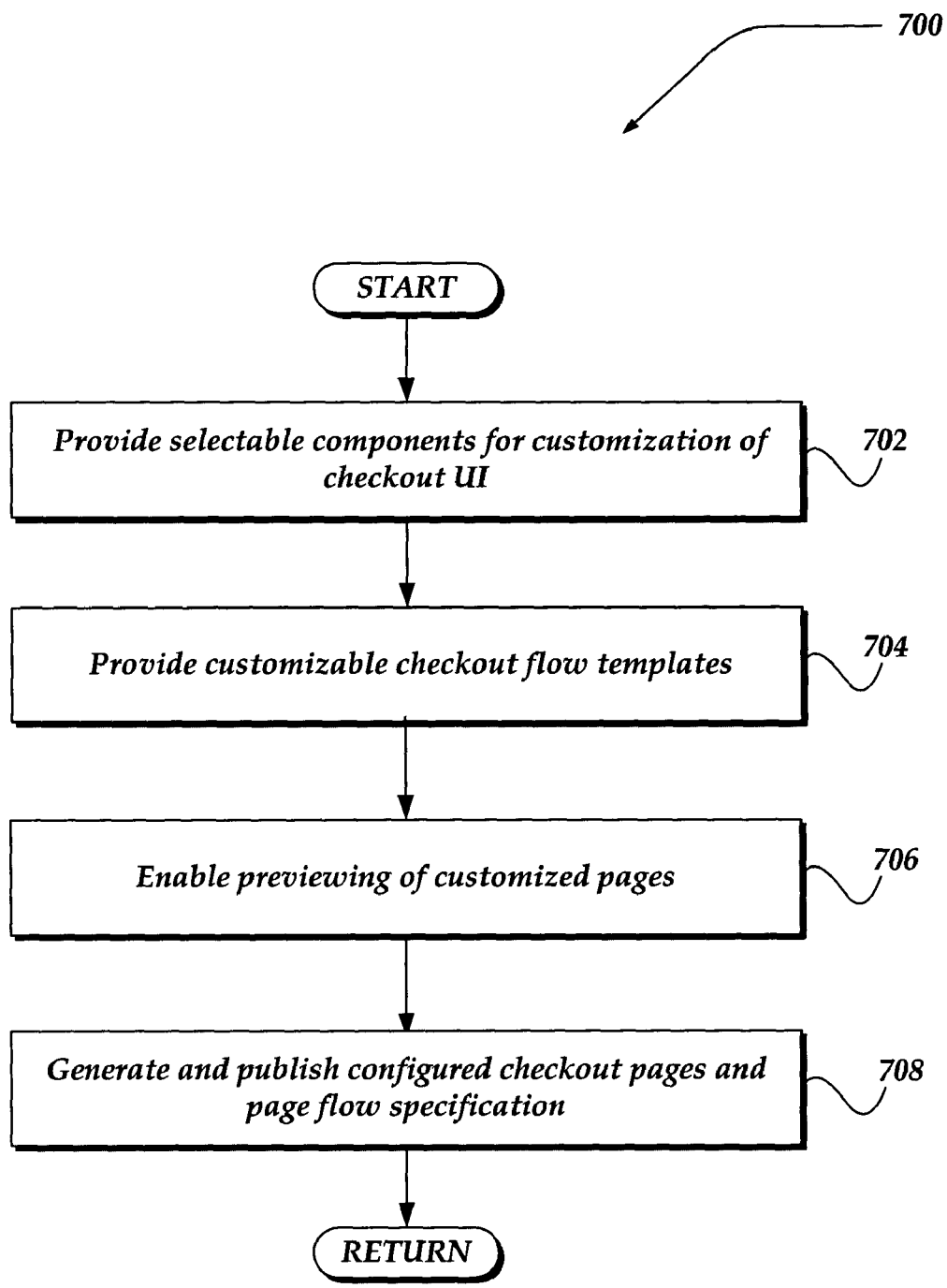
FIG. 7 illustrates a logical flow diagram generally showing one embodiment of a process for modifying the presentation of checkout pages.

FIG. 7 is a logical flow diagram showing details of a process 700 for customizing or otherwise modifying the presentation of checkout pages. After a start block, process 700 flows to block 702, at which selectable components are provided in an interface for customization of the checkout user interface to be experienced by the shopper. Next, at block 704, customizable checkout flow templates are provided. Processing next flows to block 706, where previewing of customized pages is enabled. Next, process 700 steps to block 708, at which the configured checkout pages and page flow specification are generated and published. Process 700 then returns to perform other actions.

Figure 8:
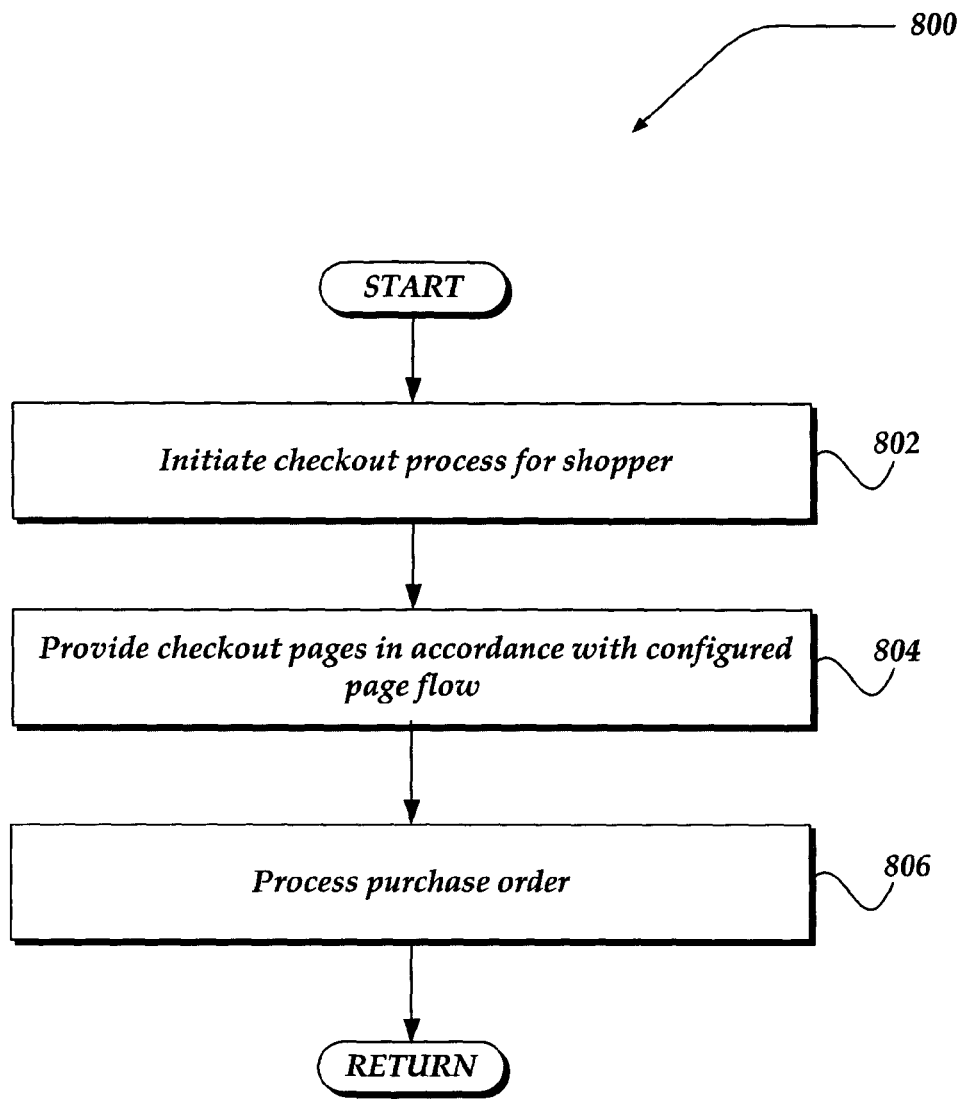
FIG. 8 illustrates a logical flow diagram generally showing one embodiment of a process for providing modified presentations of checkout pages to an online shopper.

FIG. 8 is a logical flow diagram showing details of a process 800 for providing modified checkout pages to an online shopper. After a start block, process 800 steps to block 802, where the checkout process is initiated for the shopper. Typically, a secured HTTPS connection is initiated. Because the checkout pages are modified along with pages displaying items for browsing and selection, the shopper does not experience a discontinuity between pre-checkout and checkout aspects of the shopping experience. Process 800 next flows to block 804, where checkout pages are provided to the shopper in accordance with the configured page flow. At block 806 a purchase order is processed. Process 800 then returns to perform other actions.

Figure 9:
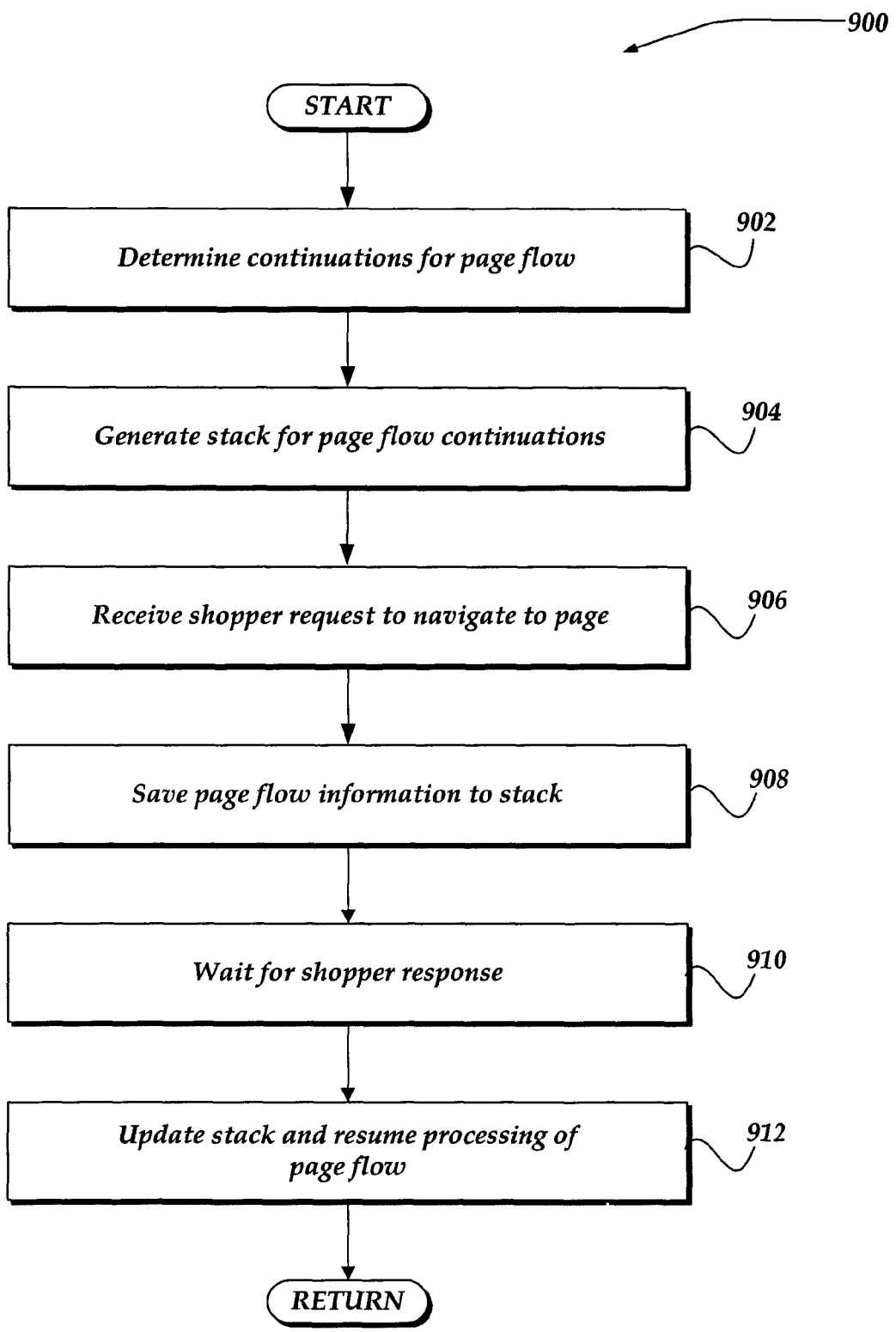
FIG. 9 illustrates a logical flow diagram generally showing one embodiment of a process for modifying a page navigation flow.

The invention may be practiced using various configuration and customization tools for specifying page appearance and page navigation flow. FIG. 9 is a logical flow diagram illustrating one embodiment of a process 900 for modifying a page navigation flow, in which continuations are used in specifying input-driven transitions between pages. As is known in the art, a continuation may represent the future of a computation at a particular point in execution. The process achieves a separation of the description of page flow from the actions associated with the flow and the objects affected by these actions. Certain aspects of this and related techniques for customizing page navigation flow are described further in co-pending and commonly-assigned application Ser. No. 11/209,399, incorporated herein by reference.

Following a start block, process 900 begins at block 902, at which required continuations for the page navigation flow are determined, in accordance with customizations or other modifications performed by the merchant or site designer. For example, a transition point in the page navigation flow in which a page requests information from the shopper or other user typically corresponds to a continuation. A page navigation flow specification is configured accordingly with continuations at the points at which the server suspends checkout processing to receive information from the shopper.

Next, processing flows to block 904, where, in the course of providing pages to the shopper, a stack for page navigation flow continuations is generated for each continuation in the flow. For example, if serving of pages is suspended while waiting for input from the shopper, a corresponding page navigation flow continuation stack is generated. If the input is received from the shopper, the page navigation flow continuation stack is employed to restore the state of the page navigation flow and to enable page navigation flow processing to resume. Unlike conventional implementations of continuations for workflow control, which typically copy the entire contents of the procedure call stack, a relatively small stack is generated to hold information for keeping track of the flow. The small stack is maintained separately from a procedure call stack. At block 906 a user request to navigate to a page or section of a page is received (for example, from a shopper browsing the store site and entering checkout). Processing advances to block 908, where page navigation flow information is saved to a continuation stack. Next, at block 910, the page navigation flow is suspended while waiting for a response from the shopper. At block 912, if the response is provided by the shopper, the continuation stack is updated and restored, and processing of the page navigation flow is resumed. Process 900 then returns to a calling process to perform other actions.

Figure 10:
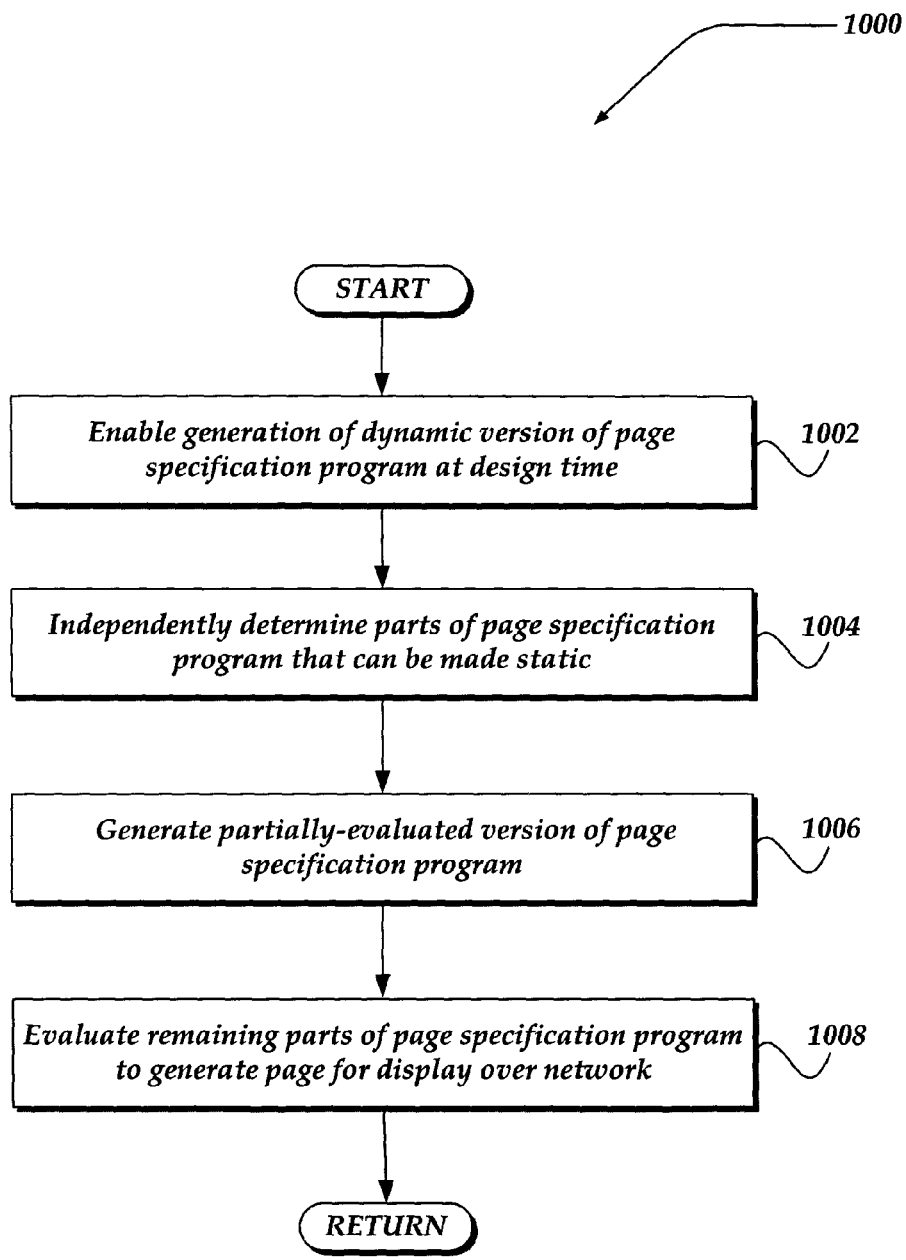
FIG. 10 illustrates a logical flow diagram generally showing one embodiment of a process for modifying the appearance of a page in which a partial evaluation technique is applied to generate a version of a page specification program for execution when the page is requested.

FIG. 10 illustrates a logical flow diagram generally showing one embodiment of a process for modifying the appearance of a page in which a partial evaluation technique is applied to generate a version of a page specification program for execution at a later time, such as when the page is requested. Certain aspects of this and related techniques for customizing or otherwise modifying page appearance are described further in co-pending and commonly-assigned application Ser. No. 11/209,249, incorporated herein by reference. Following a start block, process 1000 flows to block 1002, at which a generation of a dynamic version of a page specification program at design time is enabled. At block 1004, which may occur before or after block 1002 in time, a determination is made of the parts of the page specification program that can be made static at the conclusion of design time (and prior to request time). Block 1004 in general occurs independently of block 1002, and may occur by way of an automated process.

Process 1000 next flows to block 1006, at which a transformed, partially-evaluated version of the page specification program is generated. Processing then advances to block 1008, at which the remaining dynamic elements of the page specification program are evaluated to generate a final version of a page for display over a network. Process 1000 then returns to a calling process to perform other actions.

Embodiments of the invention may employ either or both of the configuration techniques illustrated in FIGS. 9 and 10, and embodiments may employ other modification, customization, or configuration techniques and frameworks.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method operated by a computing device for providing a customized version of the at least one secure checkout page for a site with a server device, comprising:
    providing an interface for selectively modifying a presentation of the at least one secure checkout page, including a selection of at least one of at least one display modification and at least one page flow modification for the at least one secure checkout page;
    enabling a configuration, through the provided interface, of the customized version of the presentation of the at least one secure checkout page, in accordance with each selected at least one display modification and each selected at least one page flow modification, wherein the configuration enables a continuity from another presentation of at least one other non-secure page for the site to the customized version of the at least one secure checkout page, wherein the at least one secure checkout page further comprises a secured connection for enabling at least one financial transaction by a third party site which is separate from at least one non-secured connection to the at least one other page at the site;
    generating the customized version of the presentation of the at least one secure checkout page for display over a network;
    generating a continuation associated with a transition to the at least one secure checkout page;
    generating a first stack associated with the continuation, wherein the first stack is separate from a procedure call stack; and
    resuming the continuation to allow navigation to the at least one secure checkout page if a user provides an input.

2. The method of claim 1, further comprising providing the customized version of the at least one secure checkout page to a remote user.

3. The method of claim 2, wherein providing the customized version of the at least one secure checkout page to the remote user further comprises providing the customized version of the at least one secure checkout page over a secured connection.

4. The method of claim 1, wherein the at least one secure checkout page is one of a plurality of pages comprising an online store.

5. The method of claim 1, wherein the at least one secure checkout page includes a display of a virtual shopping cart.

6. The method of claim 1, wherein the at least one secure checkout page further comprises a secured connection for enabling at least one financial transaction by a third party site which is separate from at least one non-secured connection to the at least one other page at the site.

7. The method of claim 1, wherein the interface is provided to a third-party entity.

8. The method of claim 1, wherein the interface is provided for modifying an appearance of the at least one secure checkout page.

9. The method of claim 8, wherein the at least one secure checkout page is associated with a page specification program, further comprising:
   determining at least one part of the page specification program for evaluation to a static form; and
   generating a modified version of the page specification program, wherein the determined at least one part is evaluated.

10. A server for providing a customized version of at least one secure checkout page for a site, comprising:
    a network interface for communicating with a remote device that requests access to a modification interface for selectively modifying a presentation of the at least one secure checkout page;
    a processor in communication with the network interface; and
    a memory in communication with the processor and for use in storing data and machine instructions that enable the processor to perform a plurality of operations, including:
        providing the modification interface for selectively modifying the presentation of the at least one secure checkout page, including a selection of at least one of at least one display modification and at least one page flow modification for the at least one secure checkout page;
        enabling a configuration, through the provided interface, of the customized version of the presentation of the at least one secure checkout page, in accordance with each selected at least one display modification and each selected at least one page flow modification, wherein the configuration enables a continuity from another presentation of at least one other non-secure page for the site to the customized version of the at least one secure checkout page, wherein the at least one secure checkout page further comprises a secured connection for enabling at least one financial transaction by a third party site which is separate from at least one non-secured connection to the at least one other page at the site;
        generating the customized version of the presentation of the at least one secure checkout page for display over a network;
        generating a continuation associated with a transition to the at least one secure checkout page;
        generating a first stack associated with the continuation, wherein the first stack is separate from a procedure call stack; and
        resuming the continuation to allow navigation to the at least one secure checkout page if a user provides an input.

11. The server of claim 10, wherein the at least one secure checkout page includes a display of a virtual shopping cart.

12. The server of claim 10, wherein the customization interface is provided to a third-party entity.

13. The server of claim 10, wherein the modification interface is provided for modifying an appearance of the at least one secure checkout page.

14. The server of claim 13, wherein the at least one secure checkout page is associated with a page specification program, further comprising:
    determining at least one part of the page specification program for evaluation to a static form; and
    generating a modified version of the page specification program, wherein the determined at least one part is evaluated.

15. A client device for customizing at least one secure checkout page for a site, comprising:
    a network interface for communicating with a remote device that provides a modification interface for selectively modifying a presentation of the at least one secure checkout page, including a selection of at least one of at least one display modification and at least one page flow modification for the at least one secure checkout page;
    a processor in communication with the network interface; and
    a memory in communication with the processor and for use in storing data and machine instructions that enable the processor to perform a plurality of operations, including:
        requesting access to the modification interface;
        configuring, through the provided interface, a customized version of the presentation of the at least one secure checkout page, in accordance with each selected at least one display modification and each selected at least one page flow modification, wherein the configuration enables a continuity from another presentation of at least one other non-secure page for the site to the customized version of the at least one secure checkout page, wherein the at least one secure checkout page further comprises a secured connection for enabling at least one financial transaction by a third party site which is separate from at least one non-secured connection to the at least one other page at the site;
        causing the customized version of the presentation of the at least one secure checkout page to be generated for display over a network;
        enabling a continuation associated with a transition to the at least one secure checkout page to be generated;
        enabling a first stack associated with the continuation to be generated, wherein the first stack is separate from a procedure call stack; and
        enabling a resumption of the continuation to allow navigation to the at least one secure checkout page if a user provides an input.

16. The client device of claim 15, wherein the at least one secure checkout page includes a display of a virtual shopping cart.

17. The client device of claim 15, wherein the at least one secure checkout page further comprises a secured connection for enabling at least one financial transaction by a third party site which is separate from at least one non-secured connection to the at least one other page at the site.

18. The client device of claim 15, further comprising configuring an appearance of the at least one secure checkout page.

19. The client device of claim 18, wherein the at least one secure checkout page is associated with a page specification program, further comprising:
    enabling a determination of at least one part of the page specification program for evaluation to a static form; and enabling a modified version of the page specification program to be generated, wherein the at least one part is evaluated.

20. A processor-readable, non-transitory storage medium for enabling a customized version of at least one secure checkout page to be provided for a site, storing instructions that when executed enable a computing device to perform actions, including:
- providing an interface for selectively modifying a presentation of the at least one secure checkout page, including a selection of at least one of at least one display modification and at least one page flow modification for the at least one secure checkout page;
- enabling a configuration, through the provided interface, of the customized version of the presentation of the at least one secure checkout page, in accordance with each selected at least one display modification and each selected at least one page flow modification, wherein the configuration enables a continuity from another presentation of at least one other non-secure page for the site to the customized version of the at least one secure checkout page, wherein the at least one secure checkout page further comprises a secured connection for enabling at least one financial transaction by a third party site which is separate from at least one non-secured connection to the at least one other page at the site;
- generating the customized version of the presentation of the at least one secure checkout page for display over a network;
- generating a continuation associated with a transition to the at least one secure checkout page;
- generating a first stack associated with the continuation, wherein the first stack is separate from a procedure call stack; and
- resuming the continuation to allow navigation to the at least one secure checkout page if a user provides an input.

21. A processor-readable, non-transitory storage medium storing processor-executable code for performing actions that enable a customized version of at least one secure checkout page to be provided for a site, comprising:
- providing an interface for selectively modifying a presentation of the at least one secure checkout page, including a selection of at least one of at least one display modification and at least one page flow modification for the at least one secure checkout page;
- enabling a configuration, through the provided interface, of the customized version of the presentation of the at least one secure checkout page, in accordance with each selected at least one display modification and each selected at least one page flow modification, wherein the configuration enables a continuity from another presentation of at least one other non-secure page for the site to the customized version of the at least one secure checkout page;
- generating the customized version of the presentation of the at least one secure checkout page for display over a network, wherein the at least one secure checkout page is provided over a secured connection for enabling at least one financial transaction by a third party site which is separate from at least one non-secured connection to the at least one other page at the site;
- generating a continuation associated with a transition to the at least one secure checkout page;
- generating a first stack associated with the continuation, wherein the first stack is separate from a procedure call stack; and
- resuming the continuation to allow navigation to the at least one secure checkout page if a user provides an input.

* * * * *